3,313,049
OVERLOAD LIMITER FOR SNOW BLOWERS
Peter P. Blozis, Michigan City, Ind., assignor, by mesne assignments, to Hahn, Inc., a corporation of Indiana
Filed Mar. 5, 1964, Ser. No. 349,548
5 Claims. (Cl. 37—43)

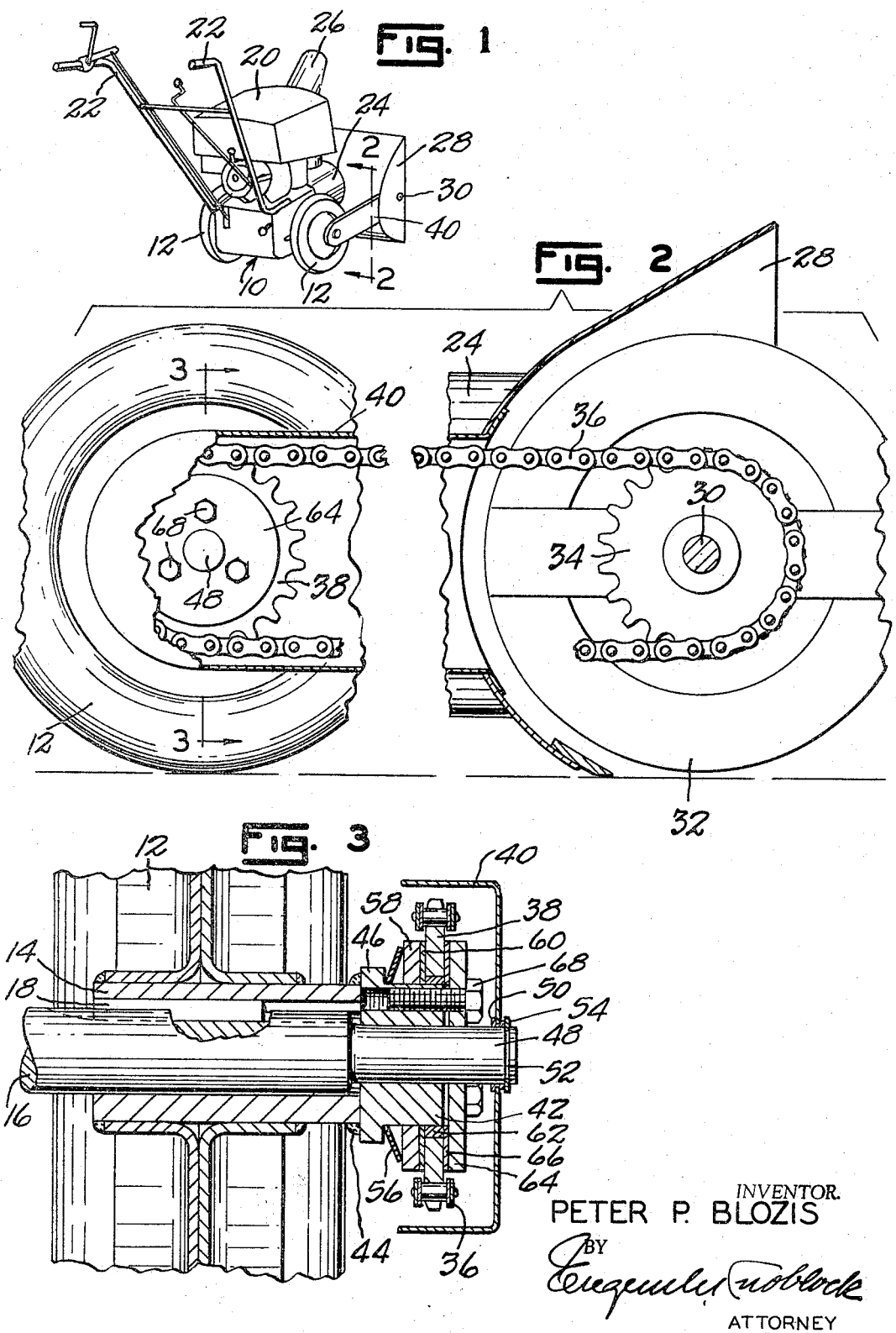
April 11, 1967     P. P. BLOZIS     3,313,049
OVERLOAD LIMITER FOR SNOW BLOWERS
Filed March 5, 1964
INVENTOR.
PETER P. BLOZIS
ATTORNEY

United States Patent Office 3,313,049
Patented Apr. 11, 1967

This invention relates to improvements in overload limiters for snow blowers, and more particularly to snow blowers of the type which is provided with a transverse auger at its leading end rotatable to break up and deliver snow to a fan or impeller for discharge laterally and spaced from the path of movement of the snow blower.

Snow blowers of this type are characterized by certain hazards in operation, and particularly the hazards of damage or injury resulting from the engagement or contact of the auger with an obstruction hidden below the surface of the snow which is being removed and displaced by the device. It is important in the functioning of the snow blower that danger of damage or injury to the auger and to the drive for operating the same may be minimized in event of contact with an obstruction, and that means be provided for limiting the torque being applied to drive the auger in the event it engages an obstruction.

It is the primary object of this invention to provide a novel, simple, inexpensive device for limiting the torque applicable to drive an auger so as to prevent the application of an overload on the drive mechanism.

A further object is to provide a device of this character which is compact, sturdy and capable of causing release of a drive upon the development of an overload condition of selected value.

Other objects will be apparent from the following specification.

In the drawing:

FIG. 1 is a perspective view of a snow blower;

FIG. 2 is a fragmentary enlarged view taken on line 2—2 of FIG. 1, illustrating a drive for a snow blower auger; and FIG. 3 is an enlarged transverse fragmentary sectional view taken on line 3—3 of FIG. 2.

Referring to the drawing which illustrates one embodiment of the invention, the numeral 10 designates the frame or chassis of a snow blower which is supported upon wheels 12. At least one of the wheels has a hub 14 mounted upon an axle or drive shaft 16. A key or spline 18 provides driving connection between the axle and the wheel hub. The chassis 10 preferably mounts a prime mover, such as an internal combustion engine or an electric motor (not shown) which may be encased within a housing portion 20. Any suitable drive means (not shown) may be employed to interconnect the motor or engine and effect a drive of the axle 16. The engine, the transmission and related parts preferably are positioned at or adjacent to the wheels 12 so that the device may readily be manipulated and guided by an operator who grasps handlebars 22 carried by and projecting rearwardly and upwardly from the frame.

The chassis carries an impeller or fan rotating within an impeller housing 24 positioned forwardly of the drive axle 16 and having a suitable discharge spout 26. The impeller housing 24 opens at a forwardly flaring transversely extending auger housing portion 28 which is open at its front and at its bottom and which journals therein a transversely extending auger axle 30. The auger axle mounts an auger 32 which is of any suitable construction and is adapted to break up and feed into the impeller housing snow which it contacts as the device is advanced. At one of its ends the auger axle 32 mounts a sprocket 34 around which is trained a chain 36 which is in turn trained around a second sprocket 38 mounted upon the driving axle 16. A protective housing 40 extends around the sprocket 38 and the portion of the chain 36 positioned rearwardly of the auger housing 28. The forward portion of the chain preferably passes through an opening in the auger housing 28 within which the drive sprocket 34 is preferably located.

The wheel hub 14 of the wheel adjacent the driving sprocket 38 has an extension portion 42 secured thereto as by welding thereof at 44 to the outer end of the hub 14. The wheel hub extension 42 preferably includes an enlarged diameter flange 46 at its inner end, and the outer end portion thereof is preferably cylindrical. The wheel hub extension may have a reduced bore to receive a reduced diameter end portion 48 of the axle 46. The chain-protecting housing 40 has an aperture aligned with and receiving with clearance the axle part 48, and this opening preferably mounts a bearing 50, such as a nylon ring of channel shape embracing the chain housing 40 around the aperture and having an inner diameter to receive the shaft part 48 with rotative clearance. The axle part 48 is preferably provided with a circumferential groove 52 at its outer portion, within which is removably mounted a spring type retainer ring 54 engageable with the outer surface of the bearing 50.

A frusto conical spring member 56 encircles the outer part of the wheel hub extension 42 and bears against the flange 46 thereof. An annular inner pressure plate 58 encircles the wheel hub extension 42 and bears against the spring 56. An inner friction disk 60 is carried by the plate 58 and bears against the inner face of the sprocket 38. The sprocket 38 is journaled upon the wheel hub extension 42 by a bearing 62. An outer annular pressure plate 64 carrying an outer friction disk 66 which bears against the outer surface of the sprocket is secured fixedly to the wheel hub extension portion 42 by cap screws 68 threaded into tapped bores in the wheel hub extension.

In the normal relation of the parts, as illustrated in FIG. 3, the spring washer 56 urges the inner pressure plate 58 outwardly so that firm frictional driving engagement is provided between the opposite surfaces of the driving sprocket 38 and the friction disks 60 and 66 carried by the pressure plates. The inner pressure plate 58 may slide endwise upon the wheel hub extension against the action of the spring washer 56 and, if desired, may be splined thereto non-rotatively. Thus, in the normal relation of the parts, rotation of the axle 16 transmitted to the wheel hubs 14 through the keys 18 is in turn transmitted from the wheel hub to the wheel hub extension 42, and at least the outer pressure plate 64. The friction grip of the pressure plates upon the drive sprocket 38 through the friction disks 60 and 66 drives the sprocket 38, and thus effects driving of the auger 32 by means of the drive chain 36.

If the auger strikes an obstruction which imposes an overload exceeding the load which the device is designed to accept, the sprocket 38 is stopped or slips relative to the continued rotation of the axle 16 and the outer pressure plate 64. The amount of overload which the device tolerates is determined by the character of the spring 56 utilized in the device. In one embodiment of the invention, a spring 56 has been selected of a strength to maintain an operative driving connection of the sprocket during overloads as great as eight times normal drive torque before release or slipping of the drive sprocket relative to the rotating outer driven annular pressure plate 64 occurs.

It will be observed that the use of the cap screws 68 maintains at a minimum the overall length of the axle shaft 16 and the projection thereof beyond the outer pressure plate 64. Likewise it will be observed that only a minimum part of the shaft 48 projects beyond the drive, that being sufficient only to support one end of the housing 40.

While the preferred embodiment of the invention has been illustrated and described, it will be understood that changes in the construction may be made within the scope of the appended claims without departing from the spirit of the invention.

I claim:
1. In a snow blower,
a chassis,
a drive axle,
a wheel having a hub keyed on said axle,
an auger mounting axle spaced from and substantially parallel to said axle,
a sprocket on said auger axle,
a sprocket journaled on said wheel hub,
a chain trained around said sprockets,
an annular pressure plate encircling said axle and secured to the end of said wheel hub,
said hub having an abutment spaced from said pressure plate,
a second annular pressure plate encircling and slidable on said wheel hub,
friction disks on said pressure plates engaging opposite surfaces of said sprocket, and
a spring encircling said hub and engaging said abutment and said second pressure plate to apply predetermined pressure to the sprocket at said friction disks.
2. The combination defined in claim 1, wherein cap screws anchor said first pressure plate to the end of said wheel hub.
3. In a snow blower,
a chassis,
a drive axle,
a wheel having a hub keyed on said axle,
an auger mounting axle spaced from and substantially parallel to said axle,
a sprocket on said auger axle,
a sprocket journaled on said wheel hub,
a chain trained around said sprockets,
an annular pressure plate encircling said axle and secured to the end of said wheel hub,
said hub having an abutment spaced from said pressure plate,
a second annular pressure plate encircling and slidable on said wheel hub,
friction disks on said pressure plates engaging opposite surfaces of said sprocket, and
a spring encircling said hub and engaging said abutment and said second pressure plate to apply predetermined pressure to the sprocket at said friction disks,
said axle projecting beyond said wheel hub,
a protective housing encircling at least part of said sprocket and chain drive and having an aperture fitting around the projecting part of said axle, and
retaining means on said axle engaging said housing.
4. The combination defined in claim 3, wherein
a bearing is carried by said housing and encircles said projecting axle part.
5. The combination defined in claim 3, wherein
the projecting part of said axle has a circumferential groove, and
said retaining means constitutes a snap ring seated in said groove.

References Cited by the Examiner
UNITED STATES PATENTS

| | | | |
|---|---|---|---|
| 2,566,724 | 9/1951 | Heil | 56—26 |
| 2,618,980 | 11/1952 | Cook et al. | 74—611 X |
| 2,651,530 | 9/1953 | Blydenburgh. | |
| 2,735,199 | 2/1956 | Wanner et al. | 37—43 |
| 2,803,103 | 8/1957 | Kollman | 56—295 |
| 2,989,127 | 6/1961 | Oertle | 172—103 X |

ANTONIO F. GUIDA, *Acting Primary Examiner.*

ABRAHAM G. STONE, R. L. HOLLISTER,
*Assistant Examiners.*